(12) United States Patent
Kaneko et al.

(10) Patent No.: US 7,684,288 B2
(45) Date of Patent: Mar. 23, 2010

(54) INFORMATION PROCESSING APPARATUS AND CONTROL METHOD OF INFORMATION PROCESSING DEVICE

(75) Inventors: Yoshihiro Kaneko, Fussa (JP); Hideaki Andou, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 12/127,448

(22) Filed: May 27, 2008

(65) Prior Publication Data

US 2008/0301721 A1    Dec. 4, 2008

(30) Foreign Application Priority Data

May 31, 2007    (JP)    ............................. 2007-145797

(51) Int. Cl.
*G11B 7/085*    (2006.01)
(52) U.S. Cl. .................. 369/30.32; 369/30.06; 720/601
(58) Field of Classification Search .............. 369/30.06, 369/30.02, 44.29, 44.11, 44.14, 53.28, 100, 369/44.34, 44.27, 116, 30.32, 30.17, 30.31, 369/30.48, 30.03; 720/601
See application file for complete search history.

(56) References Cited

U.S. PATENT DOCUMENTS 6,404,707 B1 *   6/2002   Kaneda et al. ........... 369/30.06
6,741,529 B1 *   5/2004   Getreuer .................. 369/30.17

FOREIGN PATENT DOCUMENTS

| JP | 2006-065696 | 3/2006 |
| JP | 2006-065989 | 3/2006 |
| JP | 2006-196032 | 7/2006 |

* cited by examiner

*Primary Examiner*—Ali Neyzari
(74) *Attorney, Agent, or Firm*—Pillsbury Winthrop Shaw Pittman, LLP

(57) ABSTRACT

According to one embodiment, a control method of an information processing device, includes measuring a movement amount of a body with a sensor, invalidating an operation of a switch which ejects an optical disc held in an optical disc drive, in a case where the movement amount of the body is a threshold value V1 or more, and validating the operation of the switch in accordance with a measured value of the sensor, after invalidating the operation of the switch.

10 Claims, 6 Drawing Sheets

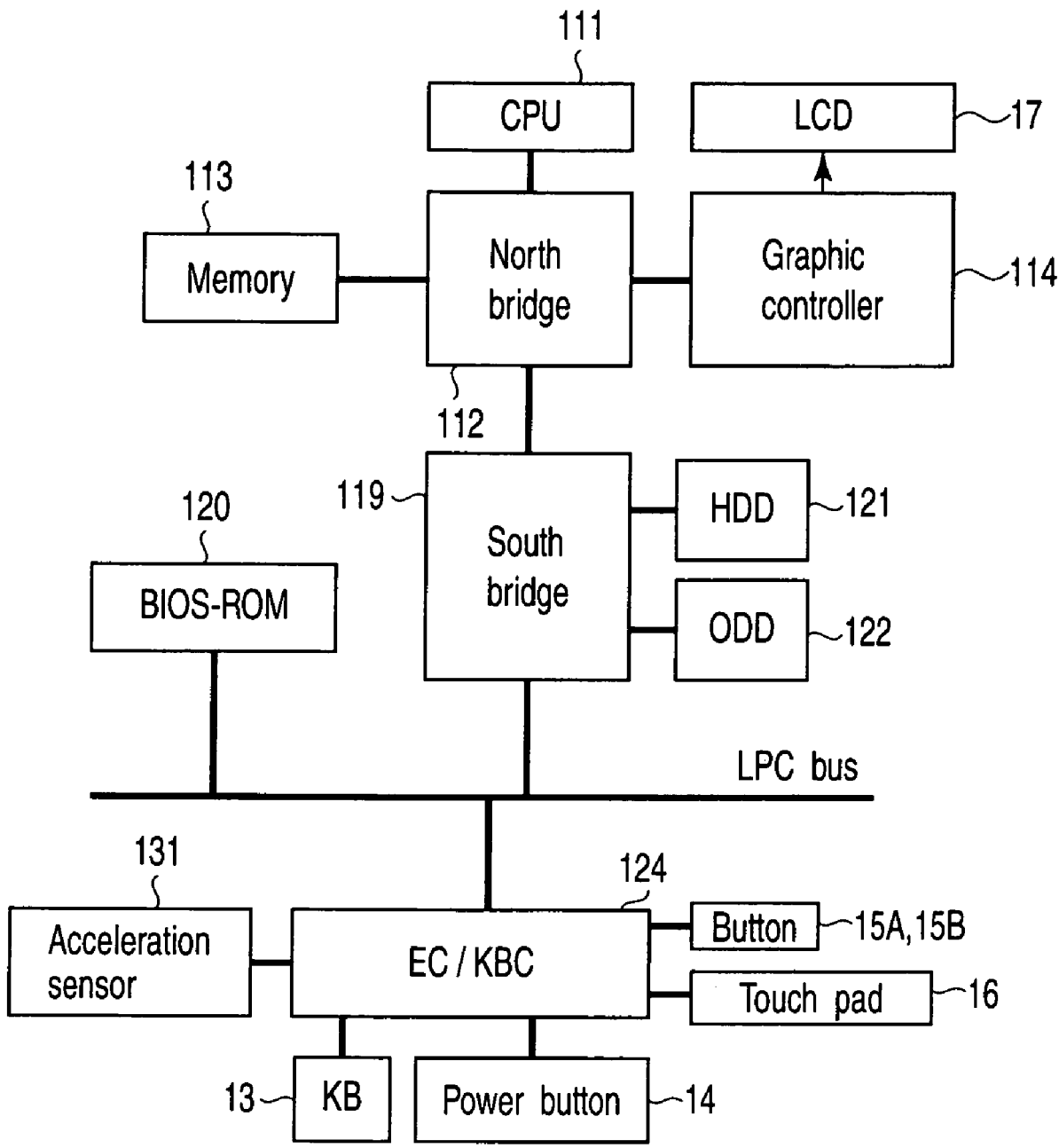
F I G. 2

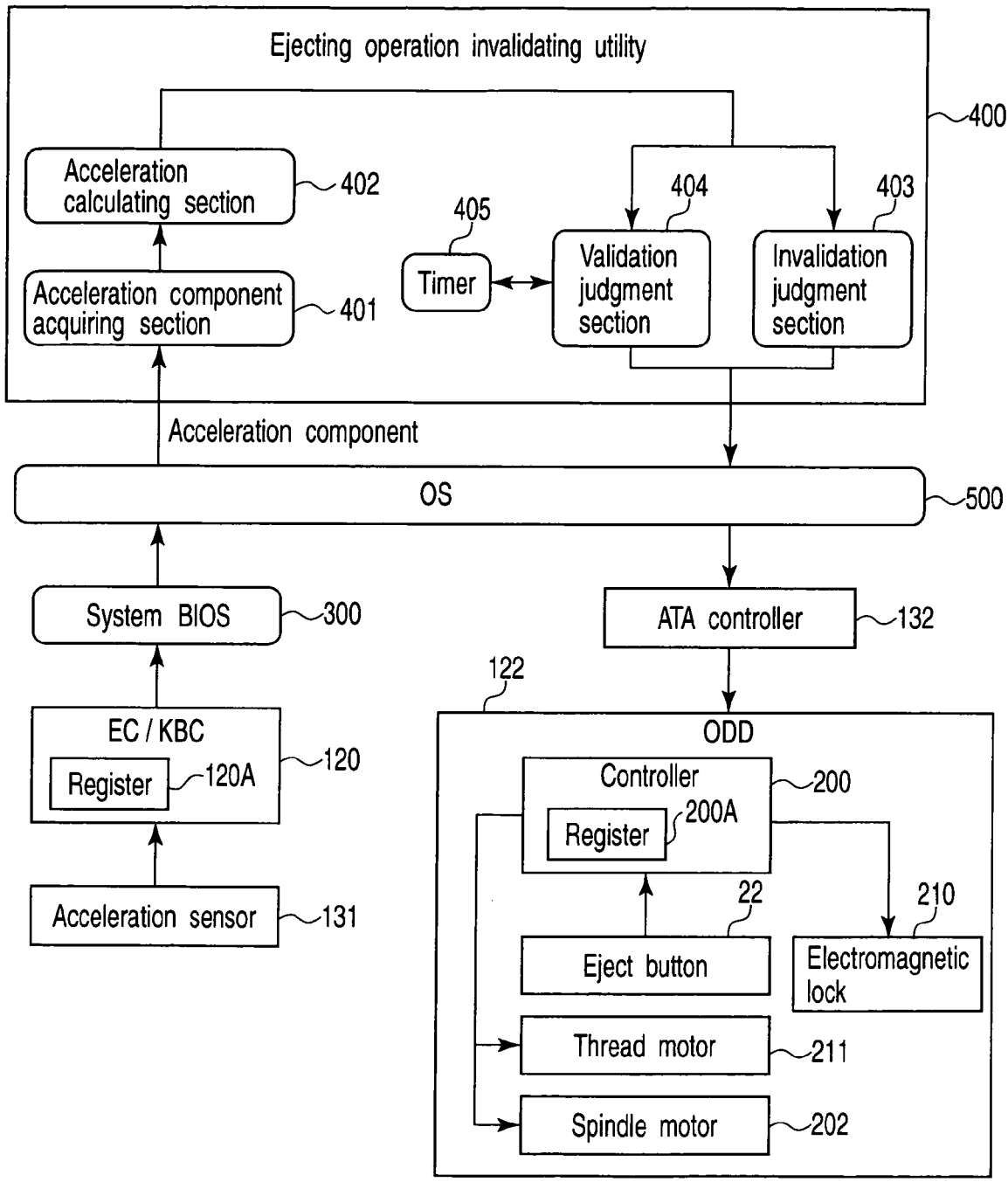
F I G. 3

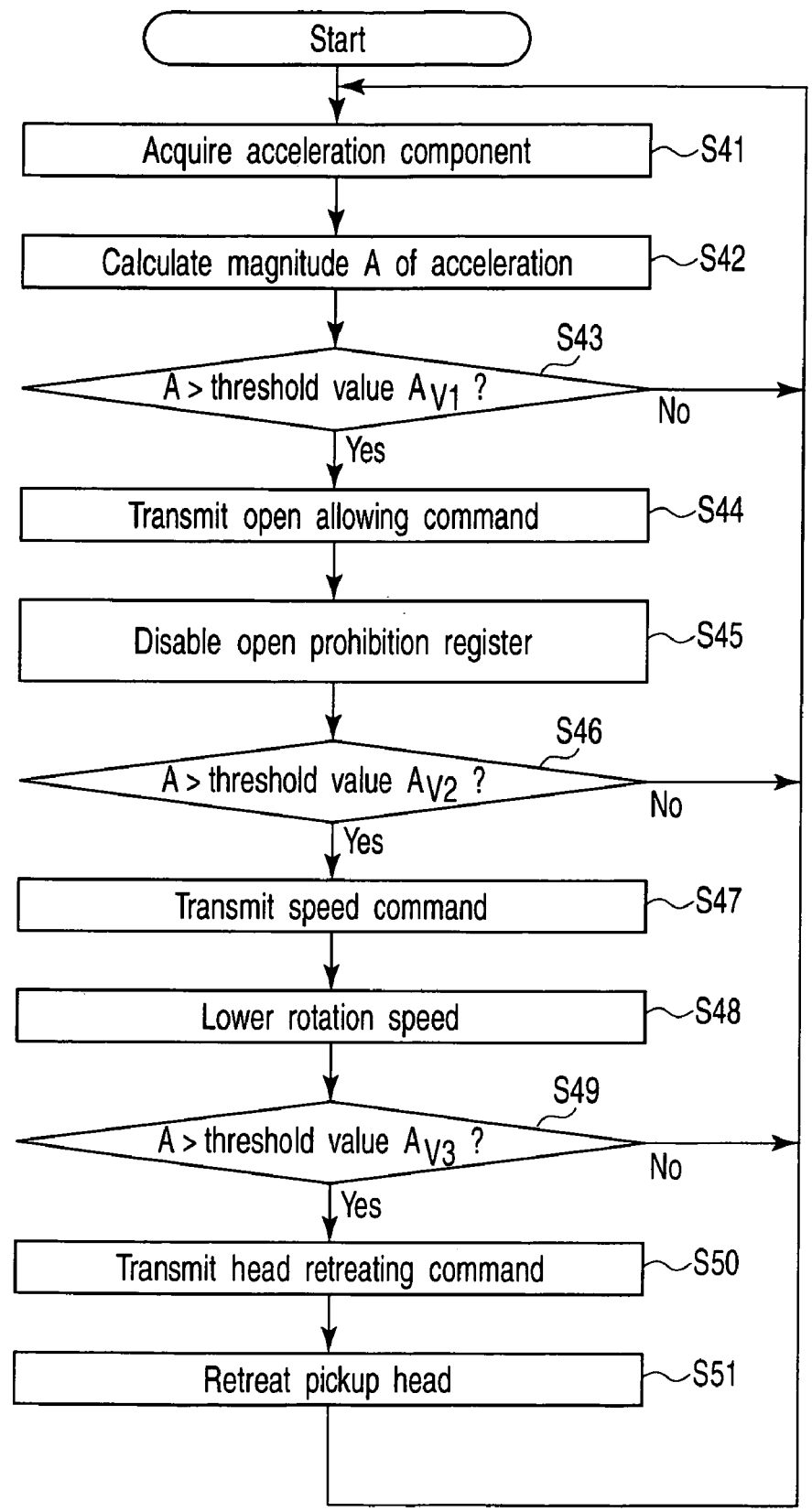
F I G. 7

INFORMATION PROCESSING APPARATUS AND CONTROL METHOD OF INFORMATION PROCESSING DEVICE

CROSS-REFERENCE TO RELATED APPLICATIONS

This application is based upon and claims the benefit of priority from Japanese Patent Application No. 2007-145797, filed May 31, 2007, the entire contents of which are incorporated herein by reference.

BACKGROUND

1. Field

One embodiment of the present invention relates to an information processing device having an optical disc drive, and a control method of the information processing apparatus.

2. Description of the Related Art

A notebook-size personal computer drivable with a battery can be used without any power source and is lightweight, so that the computer can easily be carried.

Thus, the computer has high portability and can be carried while a system is started. In this case, if an eject button of an optical disc drive is touched by accident, a tray opens and an optical disc is ejected, which might cause a trouble as the case may be.

In Jpn. Pat. Appln. KOKAI Publication No. 2006-65989, a technology is disclosed in which an operation of the optical disc drive is prohibited or the eject button is invalidated at a time when a tablet mode is set, in accordance with change (the tablet mode, a notebook-size PC mode) of a shape of the notebook-size personal computer.

In the above-mentioned technology, when the optical disc drive is used, a user inconveniently has to set the validation of the eject button.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing a system constitution of the information processing device shown in FIG. 1;

FIG. 3 is an exemplary diagram showing a system constitution for invalidating an eject button of an optical disc drive which is being carried according to a first embodiment;

FIG. 7 is an exemplary flow chart showing a procedure of processing for suppressing a possibility that regeneration of an optical disc cannot be realized.

DETAILED DESCRIPTION

Various embodiments according to the invention will be described hereinafter with reference to the accompanying drawings. In general, according to one embodiment of the invention, an information processing apparatus comprises a body, an optical disc drive provided in the body and including a holding section configure to hold an optical disc in a predetermined position, a locking section to lock a status that the optical disc is held in the predetermined position by the holding section, a switch configure to output a signal to eject the optical disc from the holding section, an unlocking section configure to release the locking by the locking section in accordance with an outputting the signal, and a control section which controls the unlocking section, a sensor configure to measure a movement amount of the body, an eject invalidating section configure to transmit, to the optical disc drive, a command to invalidate the operation of the switch, a measured value of the sensor is larger than a threshold value V1, and an eject invalidating release section configure to transmit, to the optical disc drive, an another command to validate the operation of the switch in accordance with the measured value of the sensor, after the command is transmitted.

First, a constitution of an information processing apparatus according to one embodiment of the present invention will be described with reference to FIGS. 1 and 2. This information processing apparatus is realized as a battery-drivable portable notebook-size personal computer 10.

Figure 1:
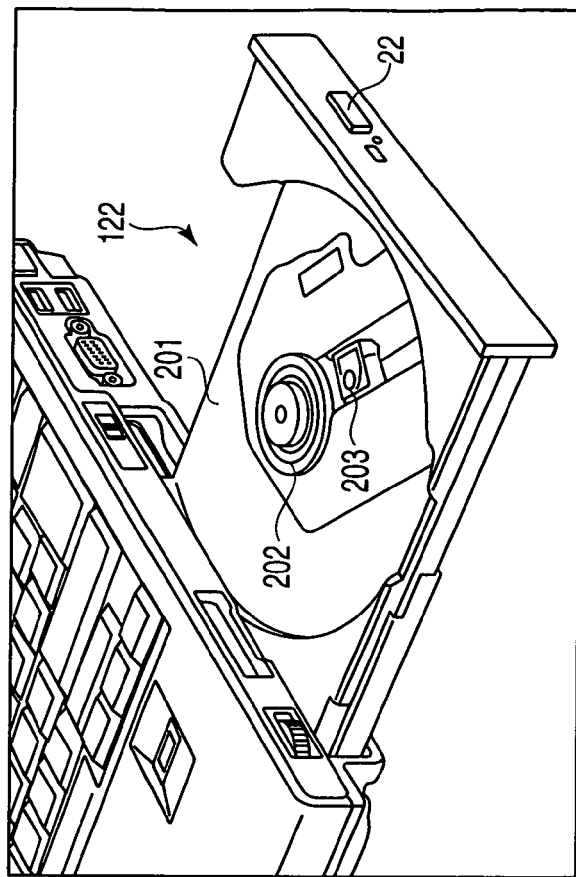
FIG. 1 is an exemplary perspective view showing an appearance of an information processing device according to a first embodiment.
Figure 1:
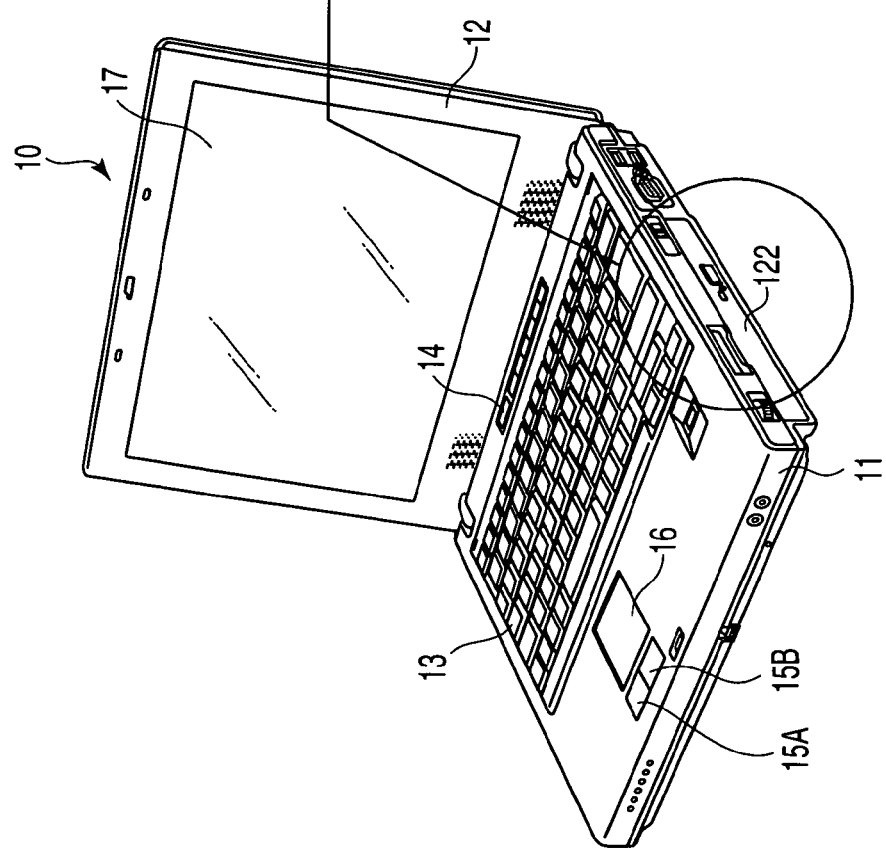

FIG. 1 is a perspective view in a state that a display unit of the notebook-size personal computer 10 is opened. The present computer 10 is constituted of a computer main body 11 and a display unit 12. In the display unit 12, a display device constituted of a liquid crystal display (LCD) 17 is incorporated, and a display screen of the LCD 17 is substantially positioned in the center of the display unit 12.

The display unit 12 is attached to the computer main body 11 so as to be rotatable between an open position and a closed position. The computer main body 11 has a thin box-like housing, and on an upper surface of the main body, a keyboard 13, a power button 14 for turning on/off a power source of the present computer 10, a left button 15A, a right button 15B, a touch pad 16 and the like are arranged.

The main body 11 is provided with an optical disc drive 122. The optical disc drive 122 has a tray 201 as a holding section, a spindle motor 202, an optical pickup head 203 and the like.

The tray 201 holds an optical disc, and can be incorporated with the main body 11. A side substrate of the tray 201 is provided with an eject button 22 for ejecting the tray 201 incorporated with the main body. The tray 201 is ejected in accordance with an operation of the eject button 22, and the optical disc held in the tray 201 can be discharged.

The spindle motor 202 rotates the optical disc in a case where the tray 201 is received. The optical pickup head 203 irradiates the optical disc with a light beam to output a detection signal of reflected light of the optical disc.

Next, a system constitution of the present computer 10 will be described with reference to FIG. 2.

As shown in FIG. 2, the present computer includes a CPU 111, a north bridge 112, a main memory 113, a graphic controller 114, a south bridge 119, a BIOS-ROM 120, a hard disc drive (HDD) 121, the optical disc drive (ODD) 122, an embedded controller/keyboard controller IC (EC/KBC) 124, a power source controller 125 and the like.

The CPU 111 is a processor provided in order to control an operation of the present computer 10, and executes an operating system (OS) and various application programs to be loaded on the main memory 113 from the hard disc drive 121.

Moreover, the CPU 111 also executes a basic input output system (BIOS) program stored in the BIOS-ROM 120. The BIOS program is a program for hardware control.

The north bridge 112 is a bridge device which connects a local bus of the CPU 111 to the south bridge 119. In the north bridge 112, a memory controller which accesses and controls the main memory 113 is also embedded. The north bridge 112 also has a function of executing communication with the graphic controller 114 via an accelerated graphics port (AGP) bus or the like.

The graphic controller 114 is a display controller which controls the LCD 17 for use as a display monitor of the present computer 10. This graphic controller 114 has a video memory (VRAM) 114A, and generates an image signal which forms a display image to be displayed in the LCD 17 of the display unit 12 from display data written in the video management 114A by the OS/application program.

The south bridge 119 controls each device on a low pin count (LPC) bus. In the south bridge 119, an integrated drive electronics (IDE) controller for controlling the HDD 121 and the ODD 122 is embedded. Furthermore, the south bridge 119 also has a function of accessing and controlling the BIOS-ROM 120.

The embedded controller/keyboard controller IC (EC/KBC) 124 is a one-chip microcomputer in which an embedded controller for power management, and a keyboard controller for controlling the keyboard (KB) 13, the left button 15A, the right button 15B and the touch pad 16 are integrated. This embedded controller/keyboard controller IC (EC/KBC) 124 has a function of turning on/off a power of the present computer 10 in accordance with a user's operation of the power button 14.

An acceleration sensor 131 outputs an acceleration of the computer 10 shown in FIG. 1, and output values Vx, Vy and Vz corresponding to x-, y- and z-axis components of a force such as a gravity applied to the computer 10. As the acceleration sensor 131, one of a servo type, a piezoelectric type, an electrostatic capacitance type and a piezoelectric resistance type is used.

The notebook-size personal computer 10 can be driven with a battery. Therefore, the personal computer 10 in an operating state can be carried. During starting, an eject button of the optical disc drive 122 might be operated by mistake.

In a state that the computer is not operated, even when the eject button is operated, there is not any problem. However, during the operation, when the eject button is accidentally touched, the tray opens and comes in contact with a certain place, so that it is supposed that the optical disc drive 122 itself might be broken.

In the present embodiment, even in a case where the eject button is pressed by mistake in a state that the operating computer is carried, the tray can be prevented from being opened. In the present embodiment, a tray type optical disc drive is assumed. However, even in a front loading type drive which has a similar problem while carried, an effect can be obtained that the optical disc is not abruptly discharged. A constitution in which the tray does not open even in a case where the eject button is pressed in a state that the operating computer is carried will hereinafter be described.

FIG. 3 is a diagram showing a system constitution for invalidating the eject button 22 of the optical disc drive 122 which is being carried according to a first embodiment of the present invention.

As shown in FIG. 3, to invalidate the eject button of the optical disc drive 122 which is being carried, the present computer 10 includes an ejecting operation invalidating utility 400, an acceleration sensor, the optical disc drive 122 and the like. The ejecting operation invalidating utility 400 is a program executed by the CPU 111.

The ejecting operation invalidating utility 400 includes an acceleration component acquiring section 401, an acceleration calculating section 402, an invalidation judgment section 403, a reset judgment section 404, a timer counter 405 and the like.

The acceleration component acquiring section 401 acquires, from the EC/KBC 124, measured values Vx, Vy and Vz of the acceleration sensor 131.

The acceleration calculating section 402 calculates $A=\sqrt{(Vx^2+Vy^2+Vz^2)}$ to obtain a magnitude A of acceleration.

The invalidation judgment section 403 judges whether or not the magnitude A of the acceleration is larger than a threshold value to judge whether or not to invalidate the eject button 22. In a case where it is judged that the magnitude A of the acceleration is larger than the threshold value, the invalidation judgment section 403 transmits, to the optical disc drive 122, a command for invalidating the operation of the eject button 22. The invalidation judgment section 403 disables a stationary register 406.

After the invalidation judgment section 403 judges that the magnitude A of the acceleration is lager than the threshold value, the reset judgment section 404 judges whether or not to validate the eject button 22. In a case where the magnitude A of the acceleration has the threshold value or less for a certain period, the reset judgment section 404 judges that the operation of the eject button may be validated. Then, in a case where it is judged that the operation may be validated, the reset judgment section 404 transmits, to the optical disc drive 122, a command for validating the operation of the eject button.

The optical disc drive 122 includes a controller 200 as an unlocking section and a control section, the eject button 22, the spindle motor 202, an electromagnetic lock 210, a thread motor 211 and the like.

The electromagnetic lock 210 locks/unlocks the tray 201 under control of the controller 200. In a state that the tray 201 is discharged (an open state), a user pushes back the tray 201, whereby the electromagnetic lock 210 locks the tray 201 to prevent the tray 201 from jumping externally. In a state that the tray 201 is closed (a closed state), the tray is unlocked, whereby the tray 201 jumps externally to obtain the open state.

The controller 200 has an open prohibition register 200A. Data stored in the open prohibition register 200A is enabling ("1") or disenabling ("0"). When the eject button 22 is operated, the controller 200 refers to the open prohibition register 200A. The controller 200 releases or non-releases the electromagnetic lock 210 in accordance with contents of the open prohibition register 200A.

Moreover, the thread motor 211 is a driving mechanism for moving the optical pickup head 203 in a diametric direction of the optical disc. The controller 200 controls the thread motor 211 to move the optical pickup head 203 to a predetermined position.

Figure 4:
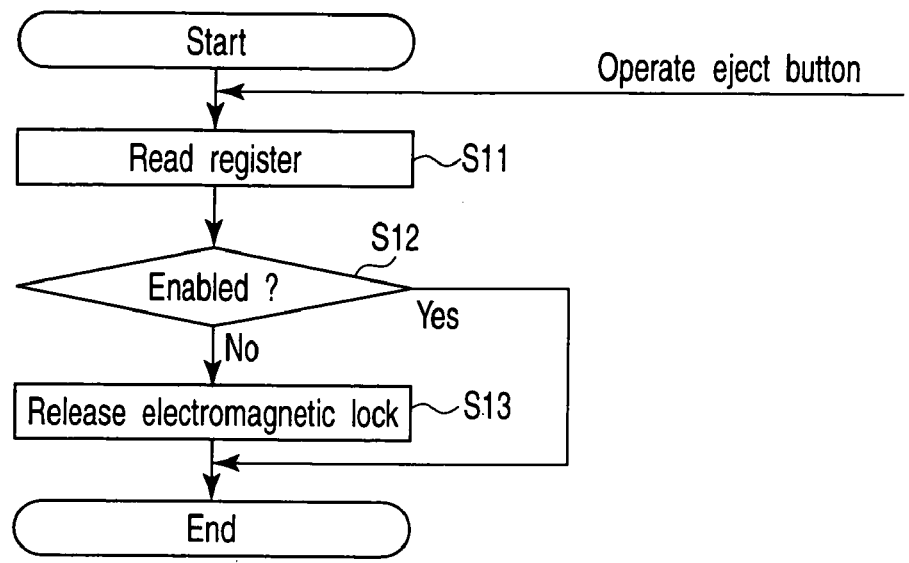
FIG. 4 is an exemplary flow chart showing a procedure of processing of a controller in a case where the eject button is operated.

Next, processing of the controller 200 in the case where the eject button 22 is operated will be described with reference to FIG. 4.

When the eject button 22 is operated, the controller 200 reads the contents of the open prohibition register 200A (step S11). The controller 200 judges whether or not the open prohibition register 200A is enabled (step S12). In a case where it is judged that the register is enabled (Yes in the step S12), the controller 200 does not do anything, and does not release the locked tray 201. In a case where it is judged that the register is not enabled, the controller 200 releases the electromagnetic lock 210 to bring the tray 201 into the open state (step S13).

Thus, the controller 200 controls the electromagnetic lock 210 in accordance with the open prohibition register 200A.

Figure 5:
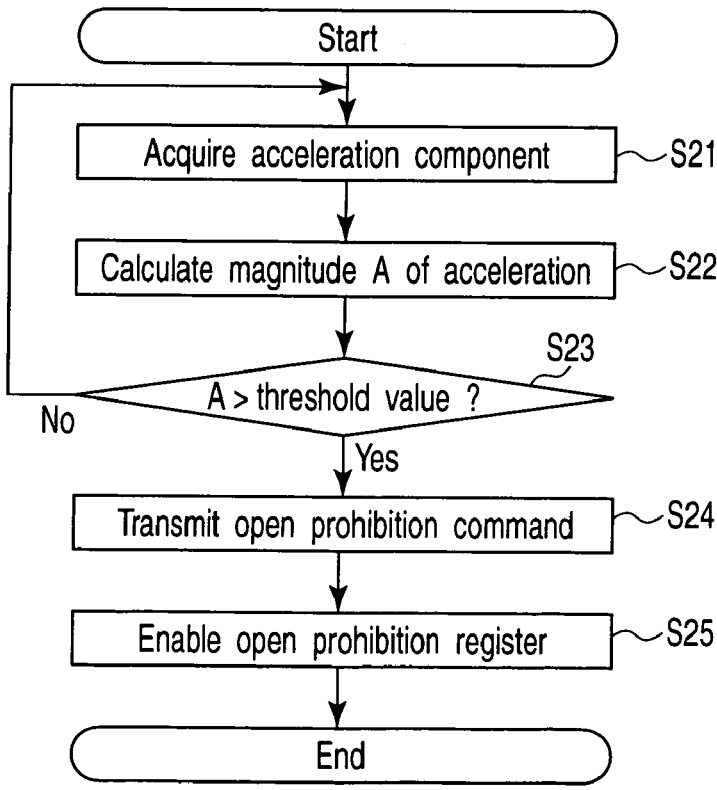
FIG. 5 is an exemplary flow chart showing a procedure of operation invalidating/reset (release of the invalidation) processing of the eject button.

Next, a procedure of operation invalidating/reset (release of the invalidation) processing of the eject button 22 will be described with reference to FIG. 5.

The acceleration component acquiring section 401 transmits an acceleration component request command to the EC/KBC 124 via a system BIOS 300 to acquire an acceleration component from the EC/KBC 124 (step S21).

The acceleration calculating section 402 calculates $A=\sqrt{(Vx^2+Vy^2+Vz^2)}$ to obtain the magnitude A of the acceleration (step S22).

The invalidation judgment section 403 judges whether or not the magnitude A of the acceleration is larger than the threshold value (step S23). In a case where it is judged that the magnitude is not larger than the threshold value (No in the step S23), the ejecting operation invalidating utility 400 periodically executes processing of the steps S21 to S23.

In a case where it is judged that the magnitude is larger than the threshold value (Yes in the step S23), the invalidation judgment section 403 transmits an open prohibition command to the optical disc drive 122 (step S24).

On receiving the open prohibition command, the controller 200 enables the open prohibition register 200A (step S25). As described with reference to FIG. 4, even when the eject button 22 is operated in the enabled state of the open prohibition register 200A, the controller 200 does not release the locking electromagnetic lock 210.

Figure 6:
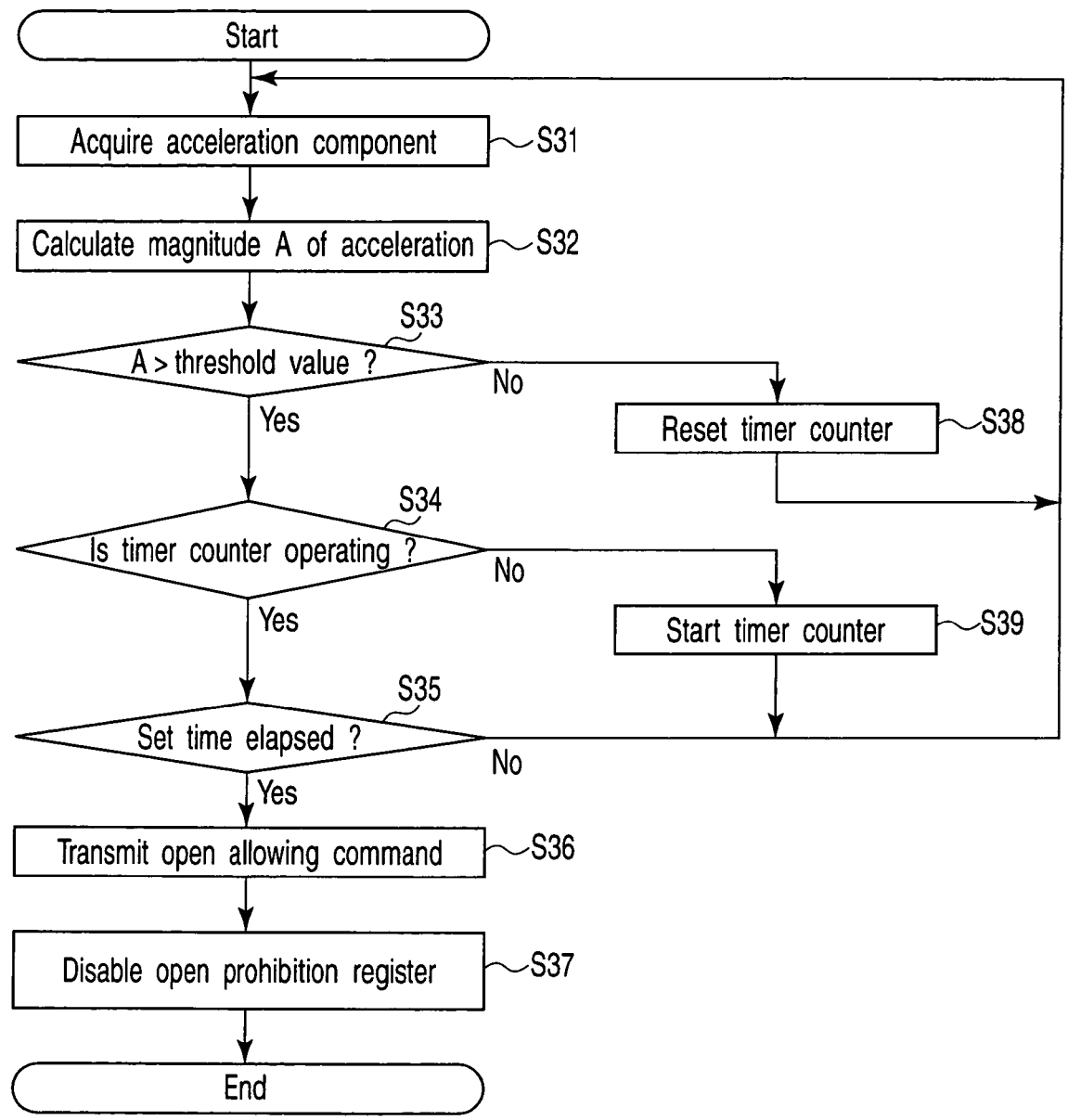
FIG. 6 is an exemplary flow chart showing a procedure of processing to validate the eject button after an open prohibition command is transmitted.

Next, a procedure of processing to validate the eject button 22 after the open prohibition command is transmitted will be described with reference to FIG. 6.

The acceleration component acquiring section 401 transmits the acceleration component request command to the EC/KBC 124 via the system BIOS 300 to acquire the acceleration command from the EC/KBC 124 (step S31).

The acceleration calculating section 402 calculates $A=\sqrt{(Vx^2+Vy^2+Vz^2)}$ to obtain the magnitude A of the acceleration (step S32).

The reset judgment section 404 judges whether or not the magnitude A of the acceleration is larger than the threshold value (step S33). In a case where it is judged that the magnitude is larger than the threshold value (Yes in the step S33), the reset judgment section 404 resets the timer counter 405 (step S38). Then, the ejecting operation invalidating utility 400 periodically executes the processing which starts from the step S31.

In a case where it is judged that the magnitude is not larger than the threshold value (No in the step S33), the reset judgment section 404 judges whether or not the timer counter 405 is operating (step S34). In a case where it is judged that the timer counter 405 is not operating (No in the step S34), the reset judgment section 404 starts the operation of the timer counter 405 (step S39). Then, the ejecting operation invalidating utility 400 executes the processing which starts from the step S31.

In a case where it is judged that the timer counter 405 is operating (Yes in the step S34), the reset judgment section 404 judges from a value of the timer counter 405 whether or not a predetermined time has elapsed (step S35).

In a case where it is judged that the predetermined time has not elapsed (No in the step S35), the ejecting operation invalidating utility 400 executes the processing which starts from the step S31.

In a case where it is judged that the predetermined time has elapsed (Yes in the step S35), the reset judgment section 404 transmits an open allowing command to the optical disc drive 122 (step S36).

The controller 200 disables the open prohibition register 200A of the tray 201 which receives the open prohibition command (step S37). As described with reference to FIG. 4, when the eject button 22 is operated in the disabled state of the open prohibition register 200A, the controller 200 releases the locking electromagnetic lock 210.

As described above, in a case where the magnitude A of the acceleration has the threshold value or more, it can be judged that the computer is being carried, to invalidate the operation of the eject button 22.

Second Embodiment

After an eject button 22 is operated, an optical disc comes in contact with a pickup head owing to vibration, and the optical disc might be damaged and could not be regenerated. In the present embodiment, processing for suppressing a possibility that the optical disc cannot be regenerated will be described with reference to FIG. 7.

An acceleration component acquiring section 401 transmits an acceleration component request command to an EC/KBC to acquire an acceleration component from the EC/KBC (step S41).

An acceleration calculating section 402 calculates $A=\sqrt{(Vx^2+Vy^2+Vz^2)}$ to obtain a magnitude A of acceleration (step S42).

An invalidation judgment section 403 judges whether or not the magnitude A of the acceleration is larger than a threshold value $A_{v1}$ (step S43). In a case where it is judged that the magnitude is not larger than the threshold value $A_{v1}$ (No in the step S43), an ejecting operation invalidating utility 400 periodically executes the processing which starts from the step S41.

In a case where it is judged that the magnitude is larger than the threshold value $A_{v1}$ (Yes in the step S43), the invalidation judgment section 403 instructs a transmitting section to transmit an open prohibition command to the utility. The transmitting section transmits the open prohibition command to an optical disc drive 122 (step S44). The transmitting section instructed to transmit the open prohibition command to the utility transmits the open prohibition command to the optical disc drive 122 (step S45).

The invalidation judgment section 403 judges whether or not the magnitude A of the acceleration is larger than a threshold value $A_{v2}$ ($>A_{v1}$) (step S46). In a case where it is judged that the magnitude is not larger than the threshold value $A_{v2}$ (No in the step S46), the ejecting operation invalidating utility 400 periodically executes the processing which starts from the step S41.

In a case where it is judged that the magnitude is larger than the threshold value $A_{v2}$ (Yes in the step S46), the invalidation judgment section 403 transmits, to the optical disc drive 122, a command for setting a rotational speed of the optical disc drive 122 to be lower than a certain speed (step S47). The controller 200 which has received the command controls the spindle motor 202 to set the rotational speed of an optical disc to be lower than a predetermined speed (step S48). The rotational speed is set to be lower than the predetermined speed, whereby even in a state that the magnitude is larger than the threshold value $A_{v2}$, that is, there is large vibration, data can stably be read from the optical disc.

The invalidation judgment section 403 judges whether or not the magnitude A of the acceleration is larger than a threshold value $A_{v3}$ ($>A_{v2}$) (step S49). In a case where it is judged that the magnitude is not larger than the threshold value $A_{v2}$ (No in the step S49), the ejecting operation invalidating utility 400 executes the processing which starts from the step S41.

In a case where it is judged that the magnitude is larger than the threshold value $A_{v3}$ (Yes in the step S49), the invalidation judgment section 403 transmits a pickup head retreating command to the optical disc drive 122 (step S50). A controller 200 controls a thread motor 211 to move an optical pickup head 203 to a standby position.

According to the above-mentioned processing, a state that a main body is stationary can be discriminated from a state that the main body is being carried, to automatically invalidate the eject button of the optical disc drive and release the invalidation.

It is to be noted that as a sensor which detects movement of the main body, an acceleration sensor is used. A sensor such as a gyro sensor other than the acceleration sensor may be used.

In the above-mentioned example, the present invention has been described from a viewpoint of the movement of the main body with a movement amount in a space. However, a concept of the movement amount includes a tilted state of the main body at a fixed point. Therefore, tilt of the main body is detected using an output of a three-dimensional sensor such as the acceleration sensor or the gyro sensor, and the eject button may be invalidated in a case where the tilt has a certain angle or more.

Moreover, a head of a hard disc drive may be retreated in accordance with a detected value by use of the sensor which detects the movement of the main body.

In a computer which is not provided with any acceleration sensor, when a power source is connected to an AC adapter, it is detected that a mode shifts to a battery mode, and the eject button may be invalidated.

In a case where the user intends to invalidate the eject button, an application may be provided so that the user can switch to invalidation/validation.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a body;
   an optical disc drive provided in the body and including a holding section configure to hold an optical disc in a predetermined position, a locking section to lock a status that the optical disc is held in the predetermined position by the holding section, a switch configure to output a signal to eject the optical disc from the holding section, an unlocking section configure to release the locking by the locking section in accordance with an outputting the signal, and a control section which controls the unlocking section;
   a sensor configure to measure a movement amount of the body;
   an eject invalidating section configure to transmit, to the optical disc drive, a command to invalidate the operation of the switch, a measured value of the sensor is larger than a threshold value V1; and
   an eject invalidating release section configure to transmit, to the optical disc drive, an another command to validate the operation of the switch in accordance with the measured value of the sensor, after the command is transmitted.

2. The information processing apparatus according to claim 1, wherein the eject invalidating release section transmits, to the optical disc drive, the another command to validate the operation of the switch, when a predetermined time has elapsed in a state that the measured value of the sensor is not larger than the threshold value V1.

3. The information processing apparatus according to claim 1, wherein the optical disc drive further includes a rotation mechanism which changes a rotation speed of the optical disc by control in accordance with the control of the control section,
   the information processing apparatus further is comprising a rotational speed command transmitting section configure to transmit, to the control section, a command to set a rotational speed of the optical disc to be lower than a predetermined speed, in a case where the measured value of the sensor is larger than a threshold value V2 (>the threshold value V1).

4. The information processing apparatus according to claim 3, wherein the optical disc drive further includes a pickup head configure to read information recorded in the optical disc, and a movement mechanism configure to move the pickup head in a diametric direction of the optical disc in accordance with the control of the control section,
   the information processing apparatus further comprising a retreating command transmitting section configure to transmit a command to move and retreat the pickup head of the optical disc to a retreated position, in a case where the measured value of the sensor is larger than a threshold value V3 (>the threshold value V2).

5. The information processing apparatus according to claim 1, wherein the sensor is an acceleration sensor.

6. A control method of an information processing apparatus, comprising:
   measuring a movement amount of a body with a sensor;
   invalidating an operation of a switch which ejects an optical disc held in an optical disc drive, in a case where the movement amount of the body is a threshold value V1 or more; and
   validating the operation of the switch in accordance with a measured value of the sensor, after invalidating the operation of the switch.

7. The control method of the information processing apparatus according to claim 6, wherein the invalidated switch operation is validated, when a predetermined time has elapsed in a state that the measured value of the sensor is the threshold value or less.

8. The control method of the information processing apparatus according to claim 6, wherein a rotational speed of the optical disc is set to be lower than a predetermined speed, in a case where the measured value of the sensor is larger than a threshold value V2 (>the threshold value V1).

9. The control method of the information processing apparatus according to claim 8, wherein a pickup head to read information recorded in the optical disc is retreated to a retreated position, in a case where the measured value of the sensor is larger than a threshold value V3 (>the threshold value V2).

10. The control method of the information processing apparatus according to claim 6, wherein the sensor is an acceleration sensor.

* * * * *